(12) United States Patent  (10) Patent No.: US 8,452,132 B2
Isaev et al.  (45) Date of Patent: May 28, 2013

(54) AUTOMATIC FILE NAME GENERATION IN OCR SYSTEMS

(75) Inventors: Andrey Isaev, Moscow Region (RU); Dmitry Deryagin, Moscow (RU); Konstantin Anisimovich, Moscow (RU)

(73) Assignee: ABBYY Software Ltd., Nicosia (CY)

( * ) Notice: Subject to any disclaimer, the term of this patent is extended or adjusted under 35 U.S.C. 154(b) by 527 days.

(21) Appl. No.: 12/749,525

(22) Filed: Mar. 30, 2010

(65) Prior Publication Data

US 2010/0215272 A1    Aug. 26, 2010

Related U.S. Application Data

(63) Continuation-in-part of application No. 12/236,054, filed on Sep. 23, 2008, now Pat. No. 8,260,049.

(51) Int. Cl.
*G06K 9/03*    (2006.01)

(52) U.S. Cl.
USPC .......................................... 382/309; 382/173

(58) Field of Classification Search
USPC .......................... 382/171, 176, 173, 199, 309
See application file for complete search history.

(56) References Cited

U.S. PATENT DOCUMENTS

| | | |
|---|---|---|
| 5,129,076 A | 7/1992 | Freeman et al. |
| 5,159,667 A | 10/1992 | Borrey et al. |
| 5,669,007 A | 9/1997 | Tateishi |
| 5,784,487 A | 7/1998 | Cooperman |
| 5,926,823 A | 7/1999 | Okumura et al. |
| 5,937,084 A | 8/1999 | Crabtree et al. |
| 6,377,704 B1 | 4/2002 | Cooperman |
| 6,694,053 B1 | 2/2004 | Burns et al. |
| 6,922,697 B1 | 7/2005 | Suehira |
| 6,963,871 B1 | 11/2005 | Hermansen et al. |
| 7,020,664 B1 | 3/2006 | Yamaguchi et al. |
| 7,197,510 B2 | 3/2007 | Abe et al. |
| 7,305,613 B2 | 12/2007 | Oezgen |
| 7,370,059 B2 | 5/2008 | Geraud |
| 7,392,473 B2 | 6/2008 | Meunier |
| 7,539,698 B2 | 5/2009 | Sakaniwa et al. |
| 2007/0239435 A1 | 10/2007 | Stuhec |

*Primary Examiner* — Duy M Dang
(74) *Attorney, Agent, or Firm* — John Meline; LeighAnn Weiland (57) ABSTRACT

Methods and system for processing document images in OCR systems, particularly for selecting a proper file name for a recognized document. The method comprises generating at least one document type hypothesis for the document; verifying each document type hypothesis; selecting a best document type hypothesis and saving the document with a proper name based on the best type hypothesis and unique features. The method further includes determining a logical structure of a document and selecting a best document model hypothesis that has the best degree of correspondence with the selected best block hypotheses for the document. On the basis of the best document model hypothesis the text document reflecting the logical structure of the source document in extended computer-editable format is formed and saved with a proper file name.

22 Claims, 7 Drawing Sheets

AUTOMATIC FILE NAME GENERATION IN OCR SYSTEMS

This application is a continuation-in-part of U.S. patent application Ser. No. 12/236,054 entitled "Model-Based Method of Document Logical Structure Recognition in OCR System" filed Sep. 23, 2008, now U.S. Pat. No. 8,260,049.

FIELD

Embodiments of the present invention are directed towards the implementation of a method and system for Optical Character Recognition and Intelligent Character Recognition OCR (ICR) that is capable of handling documents.

BACKGROUND

OCR systems may used to transform images of paper documents into a computer-readable and computer-editable form which is searchable. OCR systems may also be used to extract data from such images. A typical OCR system consists of an imaging device that produces the image of a document and software that runs on a computer that processes the images. As a rule, this software includes an OCR program, which can recognize symbols, letters, characters, digits, and other units and compound them, if they are arranged next to each other, into words, which may then be checked by means of a dictionary. Traditional OCR systems output plain text, which typically has simplified layout and formatting, retaining only paragraphs, fonts, font styles, font sizes, and some other simple properties of the source document.

However, a document may be regarded not only as text, but as an object with a physical and a logical structure.

The physical structure or document layout is in fact what makes text information a document. Physical structure is intended to keep information in an ordered form for proper and better presentation. It manifests itself as the physical arrangement of form elements such as images, tables, columns, etc. An OCR program may detect the position of form elements in a document and reconstruct them but it does not understand the purpose or meaning of the form elements. Further, the OCR program does not understand the relations between the various form elements.

The logical structure of the document maps the form elements into one or more logical blocks based on an understanding of the meaning of the form elements and the relations between them. The logical structure is what controls the logical ordering (e.g., viewing and reading order) of the information in a document. The logical structure includes information about the purpose and/or meaning of all formatting elements and defines the reading order in which the information contained in the document should be perceived. It is tightly linked with the document's physical structure and depends on the relations among the various formatting elements and their reading priorities.

The logical structure may not be so obvious from the usual, human's point of view. In most cases a "human reader" comprehends the logical structure of documents automatically; it is self-evident to him and inseparable from the document's physical structure. But this human perception is not characteristic of computers and, in particular, of OCR and document conversion programs. The logical structure of a document is beyond the traditional "machine comprehension" and may become a bottleneck in automated document recognition.

Another kind of problem occurs in processing batches of images automatically, when the user loads or scans a batch of images into an OCR application and the output is a batch of documents with recognized data. In this case, the output documents are typically named according to a pattern, for example: Document0001, Document0002, etc. The output documents may be sent to the user by e-mail or placed in a pre-defined folder. Or when recognizing newspaper or magazine pages with several articles on a page.

If the user regularly recognizes large numbers of documents, the result may be a multitude of files with similar-looking meaningless names in the user's mail box or pre-defined folder. Checking these files against their paper counterparts and renaming these files involves a lot of manual work.

SUMMARY

In one embodiment, the invention provides a method for determining the type of a document and its unique features. The method comprises generating at least one document type hypothesis for the type of a document; for each document type hypothesis, verifying said document type hypothesis; selecting a best type hypothesis; and forming a document name based on the best type hypothesis and unique features.

In another embodiment, the invention provides a method for determining the model of a document. The method comprises generating at least one document model hypothesis for the model document; for each document model hypothesis, verifying said document model hypothesis including (a) generating at least one block hypothesis for each block in the document based on the document model hypothesis; and (b) selecting a best block hypothesis for each block; and (c) selecting as a best document model hypothesis the document model hypothesis that has the best degree of correspondence with the selected best block hypotheses for the document; forming the document based on the best document model hypothesis; and forming a document name based on the best model hypothesis and the detected unique features.

BRIEF DESCRIPTION OF THE DRAWINGS

While the appended claims set forth the features of the present invention with particularity, the invention, together with its objects and advantages, will be more readily appreciated from the following detailed description, taken in conjunction with the accompanying drawings, wherein:

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown only in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Embodiments of the invention disclose a method and a system for efficient recognition of the logical structure and model of a document comprising form elements such as headings, chapters, sections, images, tables, pages, separators, paragraphs, sub-headings, tables of content, footnotes, references, bibliographies, abstracts, and figures. The form elements may have particular formatting. For example, a paragraph may be formatted to have multiple columns, or a page form element may be formatted to have a header and/or footer. Finally, a document page, e.g. a newspaper or magazine page, may include several different articles with separate titles, inserts, etc. In accordance with embodiments of the present invention, a result of OCR (ICR) is an editable text document that replicates the logical structure, layout, formatting, etc. of the original paper document or document image that was fed to the system.

Additionally, certain structural elements of a document, their order and spatial relationships, and certain keywords or unique features in titles or in other likely parts of the document may sometimes be used to classify the document as belonging to a certain type or model in the collection of available models, which, in turn, makes it possible to generate a meaningful name for the document.

Broadly, in one embodiment, the method comprises the following steps:
generating at least one document type hypothesis (i.e. a hypothesis about the type of the document) for the document;
for each document type hypothesis, verifying said document type hypothesis including
(a) a search for keywords and structural elements which are distinctive for this type of document; and
(b) a search for unique features which are distinctive for this type of document;
selecting a best document type hypothesis; and
forming a document name based on the best type hypothesis and unique features.

In another embodiment, the method comprises the following steps:
generating at least one document model hypothesis for the whole document;
for each document model hypothesis, verifying said document model hypothesis including
(a) generating at least one block hypothesis for each block in the document based on a search for keywords, structural elements, and unique features; and
(b) selecting a best block hypothesis for each block;
selecting as a best document model hypothesis the document model hypothesis that has the best degree of correspondence with the selected best block hypotheses for the document;
forming the document based on the best document model hypothesis; and
saving the document with a name based on the best model hypothesis and unique features.

In one embodiment, the system comprises an imaging device connected to a computer with specially designed OCR (ICR) software. The system is used to scan a paper document (source document) to produce a document image thereof. In another embodiment, such document image may be received on a medium, by e-mail, or obtained from an online OCR web-service.

The document may have several specific fields and form elements. For example the document may have several titles, subtitles, headers and footers, an address, a registration number, an issue date field, a reception date field, page numbering, as well as several different blocks or areas of text, font types, fonts of different sizes, tables, separators (e.g. horizontal or vertical lines), etc. Some of the titles may have one of the specified values, for example: Invoice, Credit Note, Agreement, Assignment, Declaration, Curriculum Vitae, Business Card, etc. Other documents may contains such identifying words as "Dear . . . ", "Sincerely yours" or "Best regards." The presence of these words coupled with their characteristic location on the page will often allows the system to classify the document as belonging to a particular type.

Apart from the unique features typical of the given document type, the document may contain their unique values, for example: invoice number, credit note number, a date of the agreement, signatories to the assignment, the name of the person submitting the curriculum vitae, or the name of the holder of the business card person, etc. In one embodiment, the OCR software analyzes the mutual arrangement of the above form elements and compares it with the descriptions of the possible types available to it in order to generate a hypothesis about the type of the source document. Then the hypothesis is verified and the recognized text is transformed to reproduce the native formatting of the source document. Finally, the recognized text is exported into an extended editable document format, for example, Microsoft Word, RTF, or Tagged PDF, and may be given a unique name based on the identified document type and its unique features. For example, "Invoice_#880," "Credit Note_888," "Agreement_543," "Agreement_543_page 1," "Agreement_543_page 2," "Agreement_12.03.2009," "Curriculum Vitae_Yan Allen," "Business Card_Yan Allen," "Letter to_Mr. Smith," "Letter from_Mr. Smith," etc.

In another embodiment, the logical structure of the document is recognized and is used to arrive at conclusions about the model, style, and a possible name for the recognized document. For example, the system may determine whether it is a business letter, a contract, a legal document, a certificate, an application, etc. The system stores a collection of models, each of which describes one or more possible logical structures. In the embodiment, the system generates (puts forward) a plurality of hypotheses, each corresponding to a model in the system. Then the system recognizes the document and checks how well each of the generated hypotheses corresponds to the actual properties of the document. The system evaluates each hypothesis based on the degree of correspondence. Subsequently, the system selects the model that corresponds to the best hypothesis, i.e. the hypothesis with the highest correlation with the actual properties of the document.

In order to process the document image so that its logical structure is correctly reconstructed, in one embodiment, the system is provisioned with information about specific words which may be found and the possible mutual arrangement of form elements. As noted above the form elements include elements such as columns (main text), headers and footers, endnotes and footnotes, an abstract (text fragment below the title), headings (together with their hierarchy and numbering), a table of contents, a list of figures, bibliography, the document's title, the numbers and captions of figures and tables, etc.

The correct recognition of the logical structure of a document ensures the correct reading order, the correct association of captions, the correct reproduction of the styles and headers/footers, and the ability to recreate hyperlinks in the document. Advantageously, an OCR system capable of recognizing the logical structure in accordance with the techniques disclosed herein will output not plain text, but a structured object reproducing the native formatting. This object can be exported into structured formats (extended document formats), such as Rich Text Format (RTF), Hyper Text Markup Language (HTML), or Tagged Portable Document Format (PDF). Upon saving, the recognized document is given a name which corresponds to the best model and the unique features identified. A variety of additional fields and formatting elements, including dates, line numbering, signatures, and stamps found in legal and other documents, may be recognized and retained.

Figure 1A:
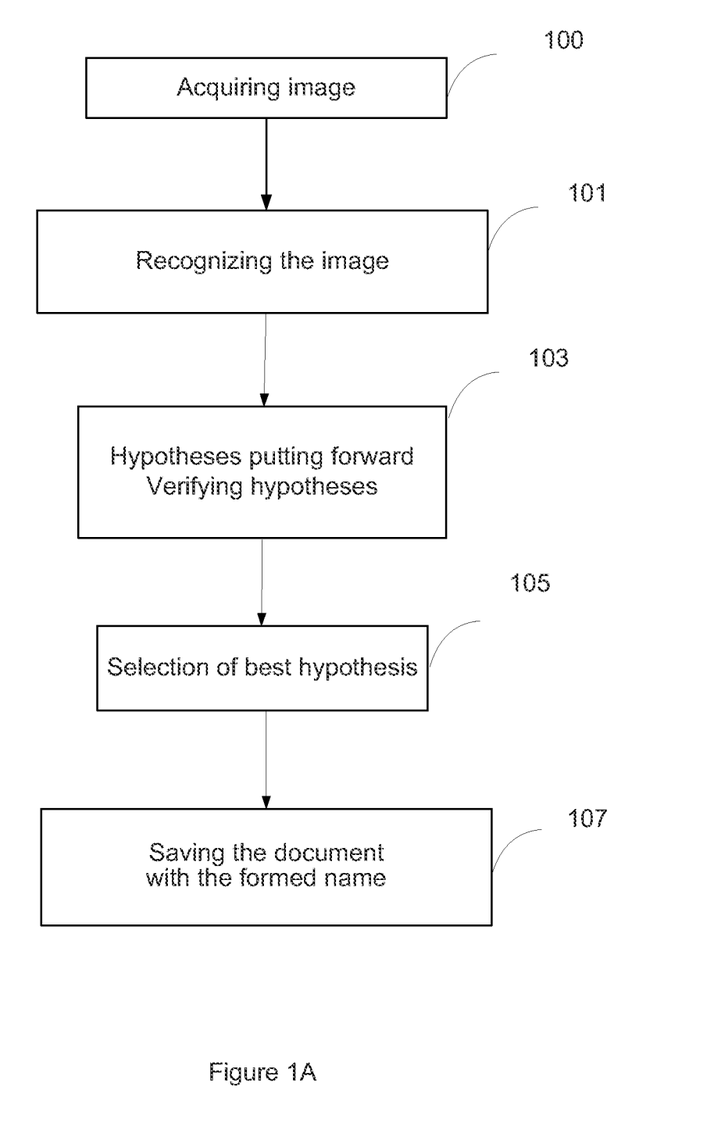
FIG. 1A shows a flowchart for recognizing a type of a document, in accordance with one embodiment of the invention.

FIG. 1A of the drawings shows the processing of documents performed in order to recognize the type of each document and to name them, in accordance with one embodiment of the invention. Referring to FIG. 1A, at block 100, a document image is acquired, e.g. from an imaging device. After that, at step 101, the document is recognized by means of OCR software, so that the result of the step 101 is the text of the document. Then, at least one document type hypothesis about the type of the document is generated. For this purpose, at step 103, predefined key words and some structural elements which are distinctive features for this type of document are searched. If such key words and/or structural elements are found, unique features which are distinctive for this type of document are searched.

In a general case, hypotheses may be generated and verified in random order or even simultaneously, however, the operator may manually specify the most probable hypotheses which are to be verified first.

As a rule, more then one hypothesis may be verified in the process, and then at step 105 the verified hypotheses are compared and the best hypothesis about the type of the document is selected. The best hypothesis may be selected on the basis of the training results. The system may be preliminary trained on a sufficient set of documents of various types.

Finally, at step 107, the document name based on the best type hypothesis and unique features is formed, and the document, in a text format, is saved to memory or sent to the user or the client.

Figure 1B:
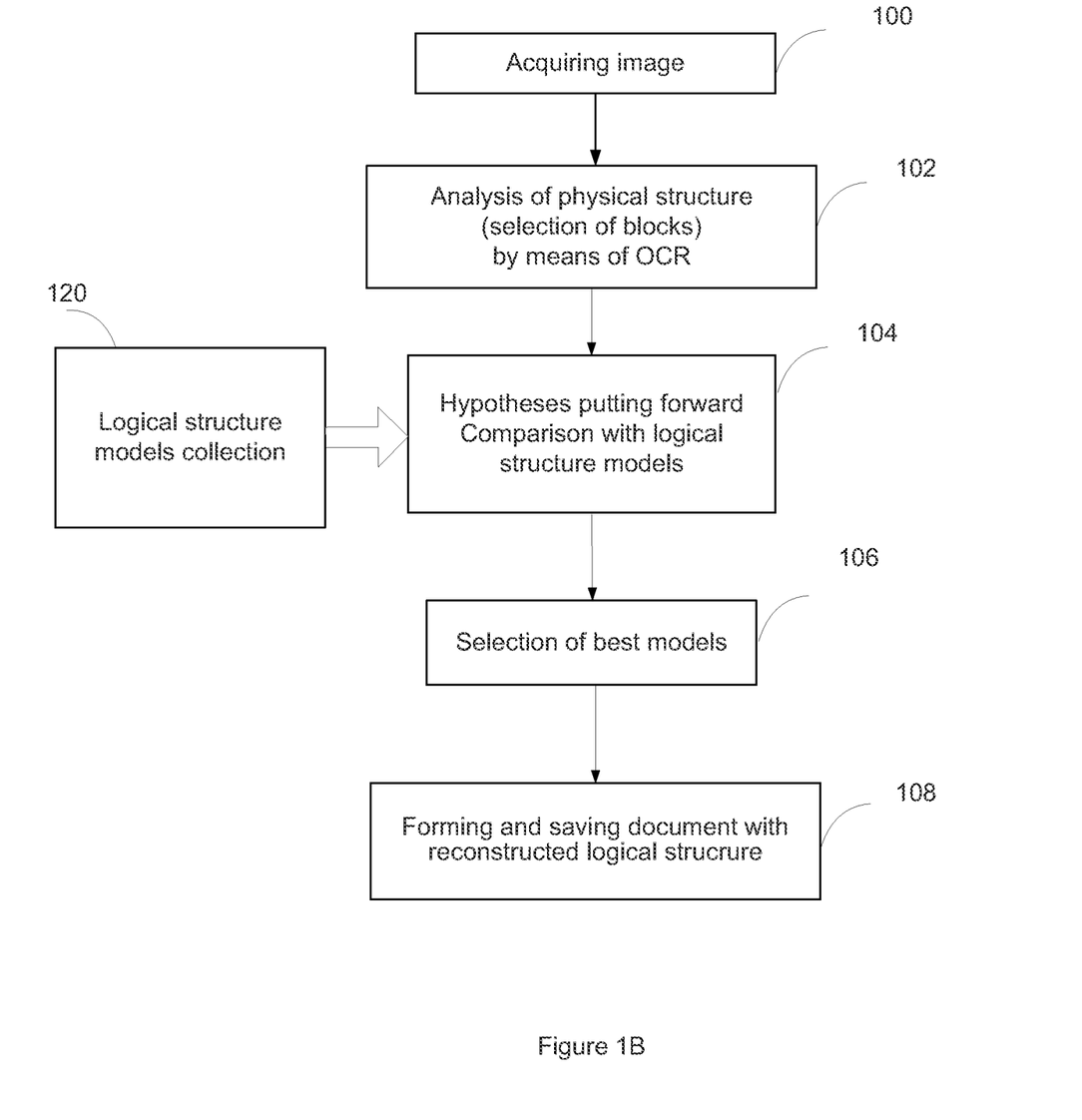
FIG. 1B shows a flowchart for recognizing a model of a document, in accordance with one embodiment of the invention.

FIG. 1B of the drawings shows processing blocks performed to recognize the logical structure of a document and its model and to give it a name, in accordance with another embodiment of the invention. Referring to FIG. 1B, at block 100 a document image is acquired, e.g. from an imaging device.

At block 102, by means of OCR software, the physical structure of the document is analyzed, and in particular, blocks are detected. The blocks may comprise text, pictures, tables, etc. In one embodiment, text occurring in the block may be clustered based on the properties of its font, i.e. a font which is only slightly different from the main font, which may be the result of incorrect OCR, is also considered as the main font.

Next, at block 104, at least one document model hypothesis about possible logical structure of the document is generated. The document model hypotheses are generated on the basis of a collection of models 120 of possible document logical structures. In one embodiment, the collection of models 120 of possible logical structures may includes models of different documents, for example, a research paper, a patent, a patent application, business letter, a contract, an agreement, etc. Each model may describe a set of essential and possible elements of logical structure and their mutual arrangement within the model. In one embodiment, for example, one of possible models of a research paper may include a title, an authors information, an abstract, an issue name, an issue number, and an issue date within page footer or page header, tables, pictures, diagrams, endnotes and footnotes, bibliography, flowcharts and other.

The collection of models may be structured. In one embodiment, the most probable document model hypothesis may be generated first, the next most probable document hypothesis is generated second, and so forth.

Then each document model hypothesis is verified. Verifying each document model hypothesis includes generating, for each text block, one or more block hypotheses. For example, in one embodiment, the system may hypothesize that the one- or two-line blocks at the very bottom (at the very top) of the page are footers (headers). In another embodiment, the system generates a header (footer) hypothesis for standalone text paragraphs of not more than three lines which are separated from the body text by a sufficiently large interval. As an additional constraint, the height of the header/footer lines may not be greater than the height of the lines in the rest of the text. To verify the hypothesis, the system checks if the assumed header/footer indeed recurs on each page, as may be required by a model in the system.

In one embodiment, various models of document headers/footers are available to the system. Various methods may be used to specify the said models. The only requirement is that a method establishes a spatial relation for the elements of the model (i.e. their location relative to the rest of the text). For example, the following header/footer models can be used:

1. Page number. Headers/footers may consist of an Arabic numeral (or, less frequently, a Roman numeral, or a letter and numeral combination, such as A1, A2, A3 . . . ) and, may be, a short word, for example "page," patterned on a known model and changing from'page to page.

2. Document attribute. An attribute may be the title, the author, or copyright owner of the document, among other things. A document attribute remains unchanged throughout the entire document.

3. Document part attribute (e.g. a chapter title). Remains unchanged on several consecutive pages, then ceases to recur.

4. Header/footer which changes from page to page but which are not described by the "page number" model above (e.g. headers in dictionaries, where the first word on the page is used as a header).

5. A combination of a document attribute or document part attribute and a page number (as in this document).

Blocks printed in fonts that are much larger than the fonts in the rest of the text or in bold fonts are considered as possible candidates for headings of different levels. The hierarchy of headings is reconstructed based on their numbering and font sizes. The reconstructed hierarchy is then used to assign the correct styles to the text fragments in the recognized document and to build a table of contents.

In one embodiment, the system generates hypotheses about figure and table captions, which are usually formatted in a style of their own and are located below, above, or, less commonly, to the side of the figure or table.

In one embodiment, the system generates hypotheses about footnotes and endnotes. Endnotes are searched for based on their typical spatial location and superscript indexes at the beginning of blocks. Footnotes are always located at the bottom of a page; only footers may be located below them. Footnotes are commonly separated from the body text by a horizontal line. Spatially, footnotes may be located immediately below the column to which they refer, or in a separate section below the columns, or in an insert in the bottom left-hand corner below multi-column text.

In some cases, the text of a footnote may carry over to the next page. These cases can be handled as follows. Once the system has detected the footnotes, it searches for their continuations: on all the pages that follow the pages with the detected footnotes, the system looks for paragraphs at the bottom of the page that have the same formatting as the detected footnotes. This method may work if the formatting of the footnotes differs considerably from the formatting of the column.

In one embodiment, the system searches for a table of contents by comparing the detected objects against the table of contents model stored in the collection 120. In another embodiment, a table of contents may be detected based on the tab leader dots or, if there are no dots, based on the numbers at the ends of the lines and the tabulation that precedes the numbers.

According to the present invention, a style describes font types and paragraph formatting. This corresponds to the notion of style as used in extended editable formats, for example, in RTF. As a result of the block 104, each hypothesis for each block contains, besides information about the logical structure, information about the style.

In one embodiment, each block hypothesis is verified. This includes comparing each block hypothesis with block models of possible logical structures for each block. Thus, the collection 120 also includes models of block logical structures, in one embodiment. Each block hypothesis is compared or evaluated on the basis of a degree of correspondence between the block hypothesis and each of the block models. Verifying each block hypothesis also includes selecting, at block 106, one or more best document models. The document model hypothesis that correlates best with the entire document is selected as the best model of the document. In one embodiment, the best model may be selected automatically by the OCR system. In another embodiment, the best model may be selected manually by the user from among several models.

Figure 4:
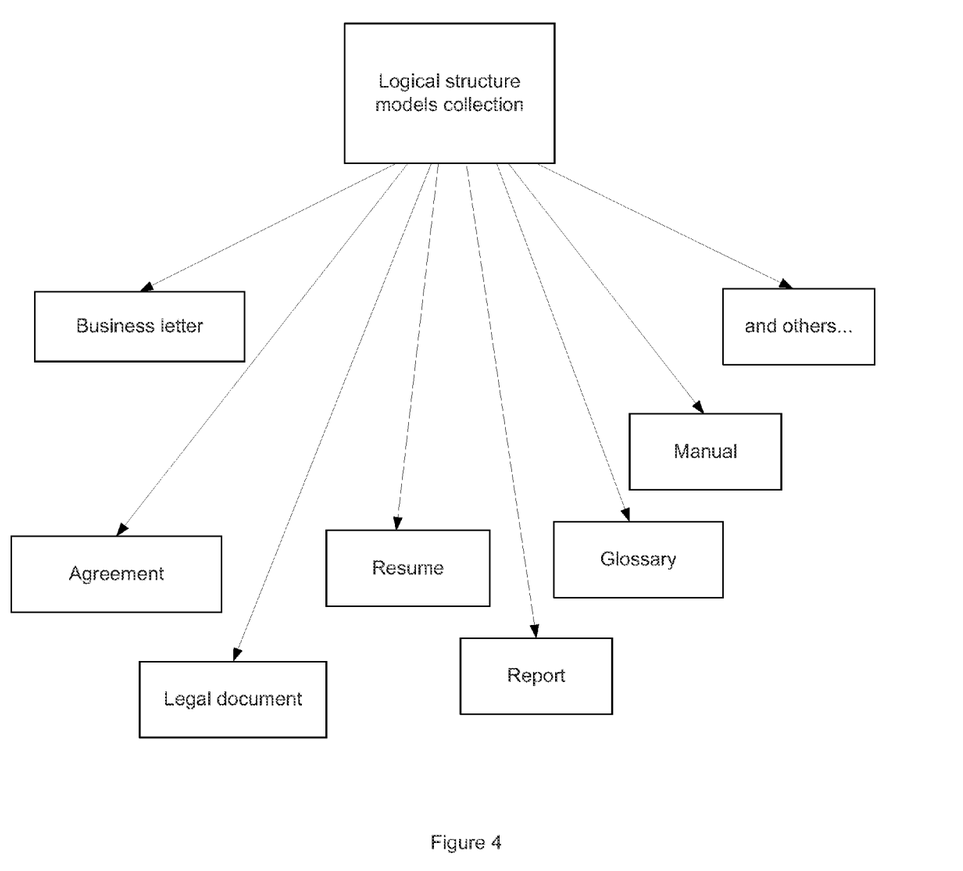
FIG. 4 shows an example description of a collection of document models, in accordance with one embodiment of the invention.

At block 108, the document with the recognized logical structure is formed and saved in an extended format in memory. Optionally, the document may be saved with a name based on the best document model and identified unique features. FIG. 4 shows an exemplary collection of document models with which the system may be provisioned. Each model may include several types of such unique features.

Figure 2:
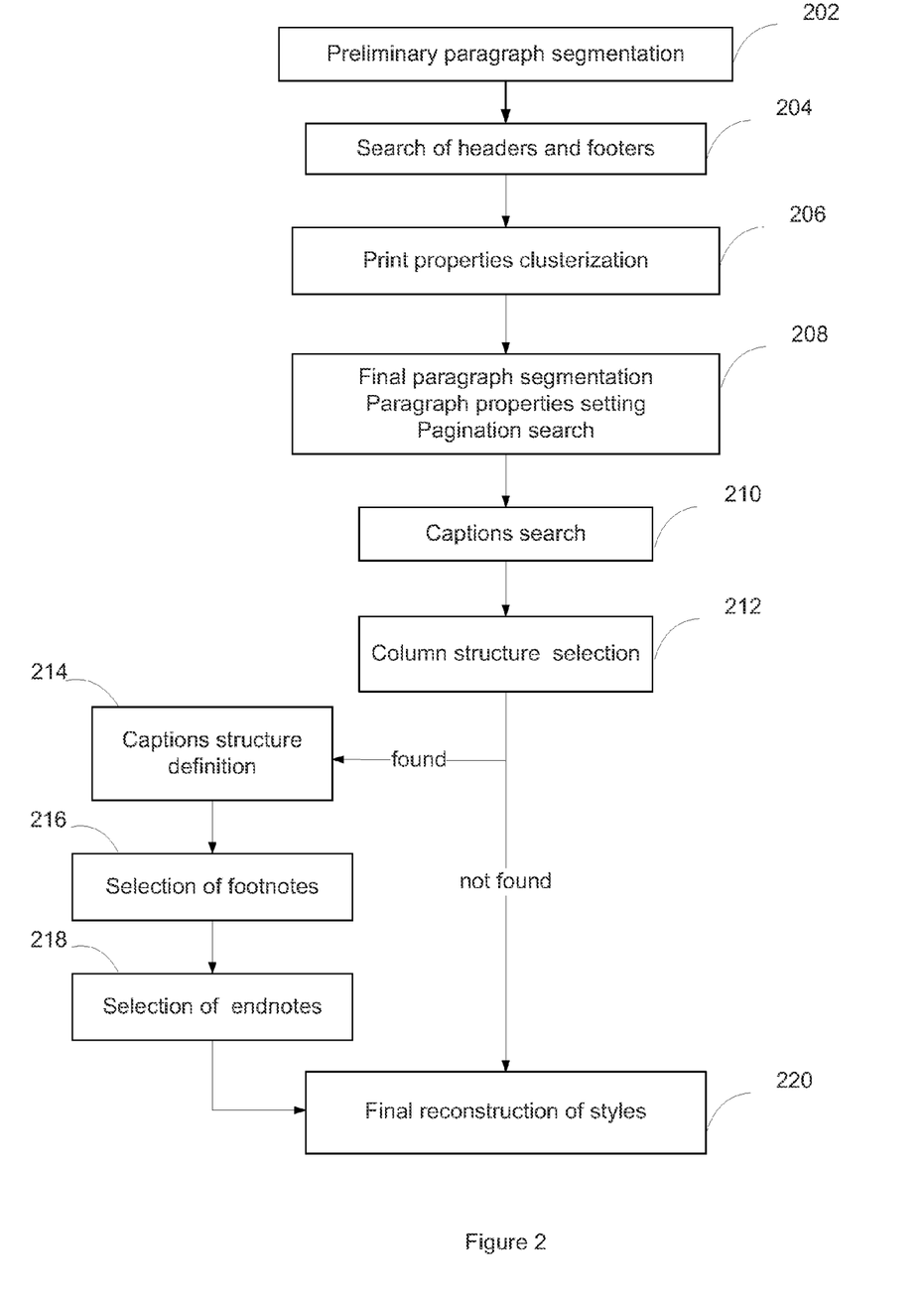
FIG. 2 shows a flowchart for recognizing the logical structure of a document, in accordance with one embodiment of the invention.

FIG. 2 of the drawings shows a flowchart of a possible sequence of actions for each generated hypothesis at the block 104 in accordance with one embodiment of the invention. Referring to FIG. 2, at block 202 the system performs a preliminary segmentation of the document into paragraphs. At block 204, the system looks for headers and footers. At block 206, the text is clustered based on the font properties. At block 208, the final division into paragraphs is performed and paragraph properties are assigned. Numberings are also searched for at this stage.

At block 210, captions are detected and processed. At block 212, columns are detected. If columns are detected, at block 214 the system creates a heading structure, and at blocks 216 and 216 footnotes and endnotes are detected.

At block 220, the final reconstruction of styles of entire document is provided.

Figure 3:
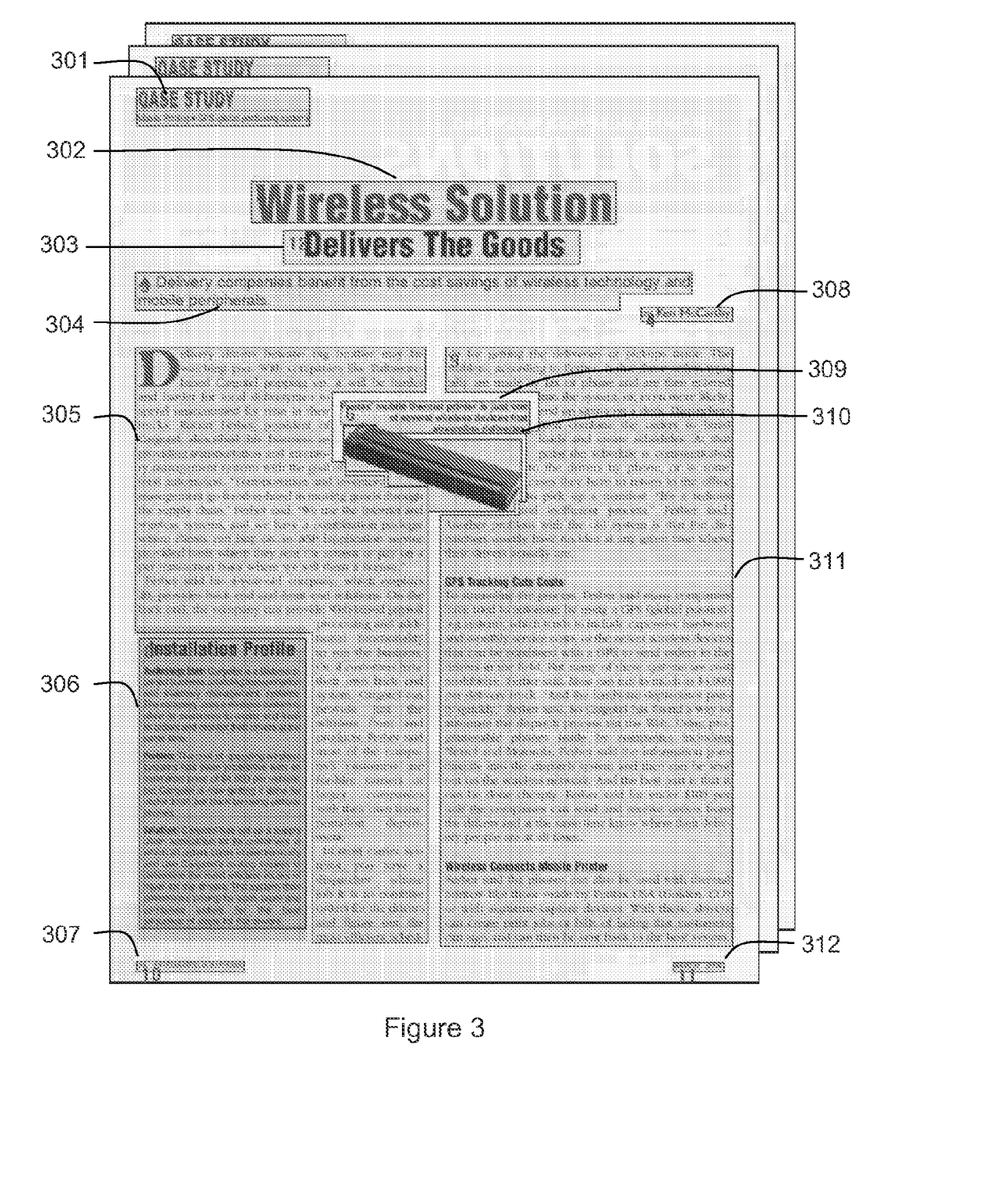
FIG. 3 shows an example of a document with selected elements of physical structure, in accordance with one embodiment of the invention.

FIG. 3 shows an example of a multipage document in which certain elements of physical structure, including a header 301, a title 302, a subtitle 302, inserts 304, 306, 308 and 309, a picture 310, footers 307 and 312 may be seen. These elements of physical structure have been selected for illustrative purposes only and are not intended to limit the scope of the invention in any way. In accordance with the techniques disclosed herein the system can detect that the text body contains two columns 305 and 311. Since the document may have page numbering, the system can recognize this too, and this hypothesis is verified on the others pages of the document.

Figure 3A:
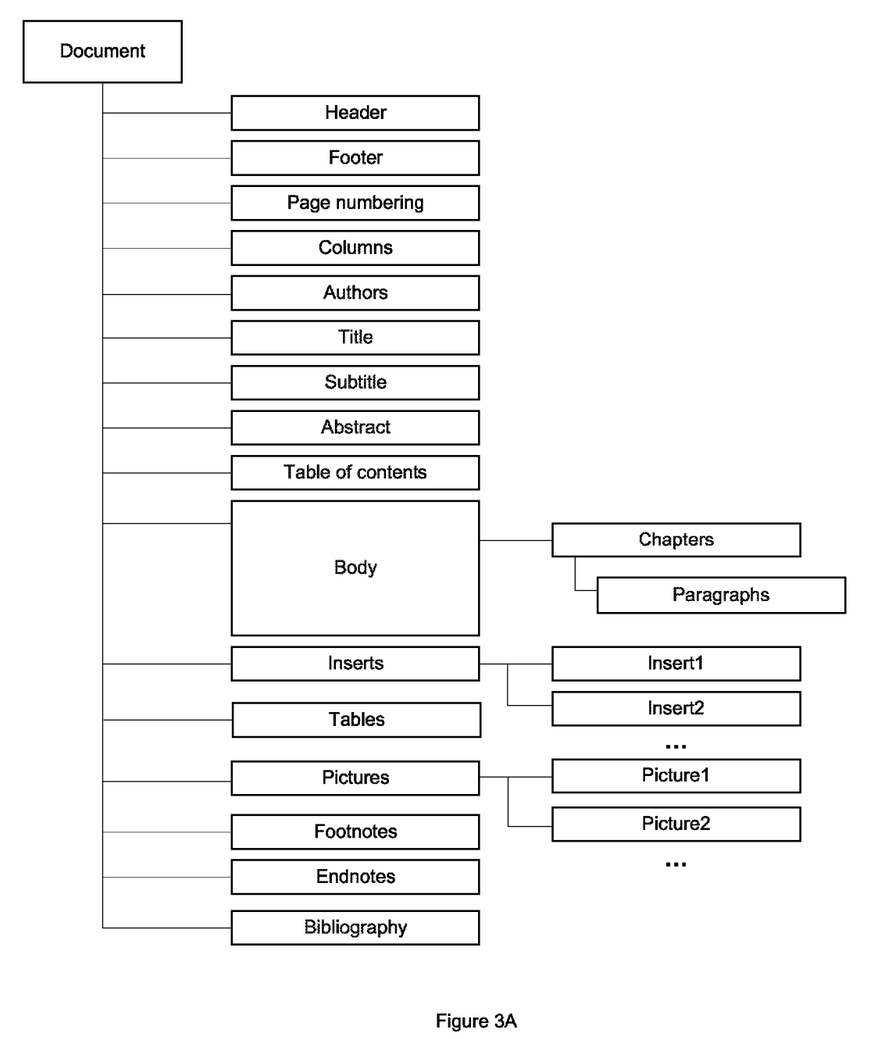
FIG. 3A shows an example of a document's logical structure description, in accordance with one embodiment of the invention.

FIG. 3A of the drawings shows an approximate example of a document's logical structure description. The logical structure is determined as a result of the OCR process disclosed herein. The elements of the logical structure description of FIG. 3A correspond to the form elements of the physical structure. The logical structure may be hierarchical, and the relations between the form elements may describe, for example, that the body includes chapters, subchapters, etc. with their numberings. Each chapter and subchapter may contain paragraphs, peculiar set of tables or/and pictures with their peculiar numberings and specific arrangement. Hereby some elements of the logical structure may have their parent elements.

FIG. 4 shows an exemplary collection of document models with which the system of the present invention may be provisioned, in accordance with one embodiment. The collection of models may include, for example, models for Agreements, Business letters, Legal documents, Resume, Reports, Glossaries, Manuals, and many others. The collection of models may be extended and enriched, for example, by users.

Figure 5:
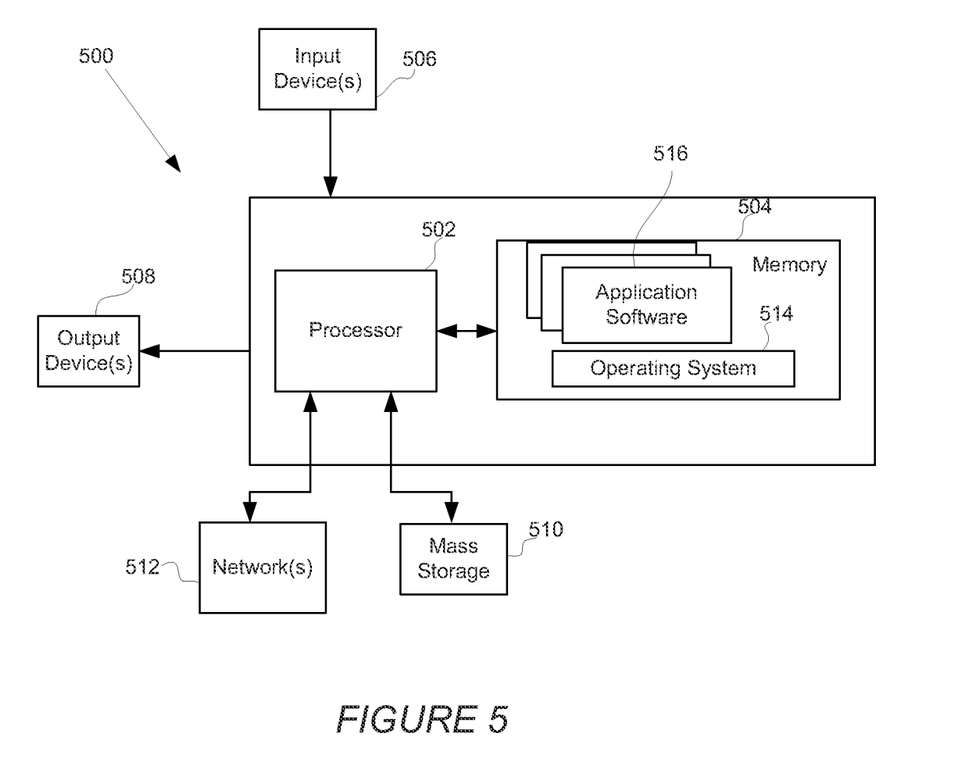
FIG. 5 shows a block diagram of hardware for an OCR system, in accordance with one embodiment of the invention.

FIG. 5 of the drawings shows an example of hardware 500 that may be used to implement the system, in accordance with one embodiment of the invention. The hardware 500 typically includes at least one processor 502 coupled to a memory 504. The processor 502 may represent one or more processors (e.g., microprocessors), and the memory 504 may represent random access memory (RAM) devices comprising a main storage of the hardware 500, as well as any supplemental levels of memory, e.g., cache memories, non-volatile or back-up-memories (e.g. programmable or flash memories), read-only memories, etc. In addition, the memory 504 may be considered to include memory storage physically located elsewhere in the hardware 500, e.g. any cache memory in the processor 502 as well as any storage capacity used as a virtual memory, e.g., as stored on a mass storage device 510.

The hardware 500 also typically receives a number of inputs and outputs for communicating information externally. For interface with a user or operator, the hardware 500 may include one or more user input devices 506 (e.g., a keyboard, a mouse, imaging device, scanner, etc.) and a one or more output devices 508 (e.g., a Liquid Crystal Display (LCD) panel, a sound playback device (speaker).

For additional storage, the hardware 500 may also include one or more mass storage devices 510, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 500 may include an interface with one or more networks 512 (e.g., a local area network (LAN), a wide area network (WAN), a wireless network, and/or the Internet among others) to permit the communication of information with other computers coupled to the networks. It should be appreciated that the hardware 500 typically includes suitable analog and/or digital interfaces between the processor 502 and each of the components 504, 506, 508, and 512 as is well known in the art.

The hardware 500 operates under the control of an operating system 514, and executes various computer software applications, components, programs, objects, modules, etc. to implement the techniques described above. Moreover, various applications, components, programs, objects, etc., collectively indicated by reference 516 in FIG. 5, may also execute on one or more processors in another computer coupled to the hardware 500 via a network 512, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks, (DVDs), etc.).

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

The invention claimed is:

1. A method for processing a document comprising:
generating at least one document type hypothesis;
verifying the at least one document type hypothesis by searching for keywords, and structural elements that are distinctive for a type of the document and by searching for one or more features which are unique for the document;
selecting a best document type hypothesis from the at least one document type hypothesis; and
saving in a memory device the document with a name based on the best document type hypothesis and at least one of the one or more features which are unique for the document.

2. The method of claim 1, the method further comprising analyzing the document using optical character recognition techniques.

3. The method of claim 1, the method further comprising:
determining a logical structure of the document;
generating at least one document model hypothesis for the document;
verifying the at least one document model hypothesis by generating at least one block hypothesis for each block in the document by searching for keywords, structural elements, and unique features that are distinctive for the block hypothesis;
selecting a best block hypothesis for each block from the at least one block hypothesis; and
selecting a best document model hypothesis having a best degree of correspondence with the selected best block hypothesis for each block in the document.

4. The method of claim 3, wherein determining the logical structure of the document comprises performing physical structure analysis to identify each block of the document.

5. The method of claim 3, wherein the name of the saved document is based on at least one of the best document type hypothesis, the best document model hypothesis and a found unique feature, and wherein the name of the saved document is further based at least in part on the best document model hypothesis.

6. The method of claim 3, wherein saving in the memory device the document further comprises forming the document in an extended computer-editable format, wherein forming the document is based on the best document model hypothesis.

7. The method of claim 3, wherein generating the document model hypothesis is based on information about mutual arrangement of blocks, keywords, structural elements, and unique features that comprise the document.

8. A system for processing a document comprising:
at least one memory; and
at least one processor controlled by stored programmed instructions in the at least one memory to perform functions of analyzing the document to cause the system to:
generate at least one document type hypothesis;
verify the at least one document type hypothesis by searching for keywords, and structural elements that are distinctive for a type of the document and by searching for one or more features which are unique for the document;
select a best document type hypothesis from the at least one document type hypothesis; and
save in the at least one memory the document with a name based on the best document type hypothesis and at least one of the one or more features which are unique for the document.

9. The system of claim 8, wherein the instructions further cause the system to:
use an optical character recognition technique.

10. The system of claim 8, wherein the instructions further cause the system to:
determine a logical structure of the document
generate at least one document model hypothesis for the document;
verify the at least one document model hypothesis by generating at least one block hypothesis for each block in the document by searching for keywords, structural elements, and unique features that are distinctive for the block hypothesis;
select a best block hypothesis for each block from the at least one block hypothesis; and select a best document model hypothesis having a best degree of correspondence with the selected best block hypothesis for each block in the document.

11. The system of claim 10, wherein determining the logical structure of the document comprises identifying each block of the document.

12. The system of claim 10, wherein the name of the saved document is based on at least one of the best document type hypothesis, the best document model hypothesis and a found unique feature, and wherein the name of the saved document is further based at least in part on the best document model hypothesis.

13. The system about mutual arrangement of blocks, keywords, structural elements, and of claim 10, wherein generating the document model hypothesis is based on at least one of information unique features that comprise the document.

14. The system of claim 8, wherein generating the at least one document type hypothesis is based on preliminarily training the system on a set of documents of various types.

15. The system of claim 10, wherein generating the at least one document model hypothesis is based on preliminarily training the system on a set of documents of various types.

16. A non-transitory computer readable medium containing a computer program product for processing a document, the computer program product comprising:
  program code for generating at least one document type hypothesis;
  program code for verifying the at least one document type hypothesis by searching for keywords, and structural elements that are distinctive for a type of the document and by searching for one or more features which are unique for the document;
  program code for selecting a best document type hypothesis from the at least one document type hypothesis; and
  program code for saving in a memory device the document with a name based on the best document type hypothesis and at least one of the one or more features which are unique for the document.

17. The non-transitory computer readable medium of claim 16, the computer program product further comprising:
  program code for analyzing the document in a computer-editable format using an optical character recognition technique.

18. The non-transitory computer readable medium of claim 16, the computer program product further comprising:
  program code for generating at least one document model hypothesis for the document;
  program code for verifying the at least one document model hypothesis by generating at least one block hypothesis for each block in the document by searching for keywords, structural elements, and unique features that are distinctive for the block hypothesis;
  program code for selecting a best block hypothesis for each block from the at least one block hypothesis; and
  program code for selecting a best document model hypothesis having a best degree of correspondence with the selected best block hypothesis for each block in the document.

19. The non-transitory computer readable medium of claim 18, wherein determining the logical structure of the document includes identifying each block of the document.

20. The non-transitory computer readable medium of claim 18, wherein the name of the saved document is based on at least one of the best document type hypothesis, the best document model hypothesis and a found unique feature.

21. The non-transitory computer readable medium of claim 18, wherein generating the document model hypothesis is based on information about mutual arrangement of blocks, keywords, structural elements, and unique features that comprise the document.

22. The non-transitory computer readable medium of claim 18, wherein saving in the memory device the document further comprises forming the document in extended computer-editable format, wherein forming the document is based on the best document model hypothesis.

* * * * *